United States Patent
Miura et al.

(10) Patent No.: US 10,005,912 B2
(45) Date of Patent: Jun. 26, 2018

(54) INORGANIC CHROMIUM-FREE METAL SURFACE TREATMENT AGENT

(75) Inventors: Yusuke Miura, Tokyo (JP); Toshiaki Shimakura, Tokyo (JP)

(73) Assignee: Chemetall GmbH, Frankfurt (DE)

( * ) Notice: Subject to any disclaimer, the term of this patent is extended or adjusted under 35 U.S.C. 154(b) by 487 days.

(21) Appl. No.: 13/701,736

(22) PCT Filed: Jun. 8, 2011

(86) PCT No.: PCT/JP2011/063163
§ 371 (c)(1),
(2), (4) Date: Jul. 17, 2013

(87) PCT Pub. No.: WO2011/155538
PCT Pub. Date: Dec. 15, 2011

(65) Prior Publication Data
US 2013/0284049 A1    Oct. 31, 2013

(30) Foreign Application Priority Data

Jun. 9, 2010  (JP) ................................ 2010-132006
Jun. 8, 2011  (JP) ................................ 2011-128002

(51) Int. Cl.
*C23C 22/34* (2006.01)
*C23C 22/36* (2006.01)
*C09D 5/08* (2006.01)
*C23C 22/44* (2006.01)
*C23C 22/00* (2006.01)

(52) U.S. Cl.
CPC ................ *C09D 5/08* (2013.01); *C23C 22/34* (2013.01); *C23C 22/361* (2013.01); *C23C 22/44* (2013.01)

(58) Field of Classification Search
CPC ....... C23C 22/34; C23C 22/361; C23C 22/44; C09D 5/08
See application file for complete search history.

(56) References Cited

U.S. PATENT DOCUMENTS

| 5,427,632 A | 6/1995 | Dolan |
| 6,482,274 B2 | 11/2002 | Shimakura et al. |
| 6,572,983 B2 | 6/2003 | Shimakura et al. |
| 2003/0209293 A1* | 11/2003 | Sako et al. .................... 148/273 |
| 2009/0078340 A1 | 3/2009 | Ando et al. |
| 2010/0028541 A1 | 2/2010 | Nagai et al. |
| 2010/0176000 A1* | 7/2010 | Inbe .................. C08G 73/0246 205/50 |

FOREIGN PATENT DOCUMENTS

| EP | 0774535 A1 | 5/1997 |
| JP | 07-145486 A | 6/1995 |
| JP | 09-020984 A | 1/1997 |
| JP | 2000-199077 A | 7/2000 |
| JP | 2001-240977 A | 9/2001 |
| JP | 2001-240979 | 9/2001 |
| JP | 2008-208408 A | 9/2008 |
| JP | 2008-261035 A | 10/2008 |
| JP | 2009-185392 A | 8/2009 |
| JP | 2009-209393 A | 9/2009 |
| JP | 2009-299145 A | 12/2009 |
| WO | 97/02369 A1 | 1/1997 |
| WO | 00/24948 A1 | 5/2000 |
| WO | 02/061005 A1 | 8/2002 |
| WO | 2006/118218 A1 | 11/2006 |
| WO | WO 2008029926 | * 3/2008 ............. C23C 28/00 |

OTHER PUBLICATIONS

Corrosion Testing Standards, JIS Z 2371, copyright 2006, Ascott Analytical Equipment Limited, http://www.ascott-analytical.co.uk/standard_corrision_tests/CorrStds . . . visited Apr. 22, 2016, one page.
Supplementary European Search Report for EP Patent Application No. 11792495.1, Completed on Dec. 13, 2017, 2 pages.

* cited by examiner

*Primary Examiner* — Lois Zheng
(74) *Attorney, Agent, or Firm* — Armstrong Teasdale LLP

(57) ABSTRACT

An inorganic chromium-free metal surface treatment agent contains a compound X containing a metal $X^1$, ionic species of which containing the metal $X^1$ become cations in an aqueous solution, and a compound Y containing a metal $Y^1$, ionic species of which containing the metal $Y^1$ become anions in an aqueous solution, a total content of the compound X being from 0.01 to 10% by mass, a total content of the compound Y being from 0.01 to 10% by mass, a molar ratio of the metal $X^1$ in the cation and the metal $Y^1$ in the anion being from 0.1 to 5, the metal $X^1$ being at least one member selected from the group consisting of Ti, Zr and Al, the metal $Y^1$ being at least one member selected from the group consisting of Ti, Zr, Si, B and Al, and the metal surface treatment agent containing substantially no organic resin.

21 Claims, No Drawings

INORGANIC CHROMIUM-FREE METAL SURFACE TREATMENT AGENT

This application is a § 371 of International Application No. PCT/JP2011/063163 filed Jun. 8, 2011, and claims priority from Japanese Patent Application Nos. 2010-132006 filed Jun. 9, 2010 and 2011-128002 filed Jun. 8, 2011.

TECHNICAL FIELD

The present invention relates to an inorganic chromium-free metal surface treatment agent containing substantially no organic resin, which may be applied to primary rust prevention of a metal material, such as a galvanized steel sheet material, a steel sheet material and an aluminum material.

BACKGROUND ART

A metal material, such as a galvanized steel sheet material, a steel sheet material and an aluminum material, is corroded through oxidation with oxygen and moisture in the air, and ions or the like contained in moisture. As a measure for preventing the corrosion, there is a method of forming a chromate film by making the metal surface in contact with a treatment solution containing chromium, such as chromic chromate and phosphoric chromate. The film formed by the chromate treatment is excellent in corrosion resistance and adhesiveness to a paint film, but has a problem that the treatment solution therefor contains harmful hexavalent chromium, which causes increase of the time and labor and the cost for the disposal of the treatment solution. Furthermore, the film formed by the treatment contains hexavalent chromium, and thus tends to be prevented from being used.

Accordingly, there have been proposals of an aqueous liquid composition for treating metal surface and a chemical conversion treatment agent that has corrosion resistance equivalent to an conventinal chromate chemical conversion coating and do not contain chromate (see, for example, Patent Documents 1 and 2).

The aqueous liquid composition of Patent Document 1 contains water, (A) a component containing a fluorometallic acid anion in an amount of 0.010 mol/kg or more, (B) a component containing a divalent or tetravalent cation selected from the group consisting of cobalt, magnesium, manganese, zinc, nickel, tin, copper, zirconium, iron and strontium, (C) a component containing at least one anion selected from a phosphorus-containing inorganic oxyanion and a phosphonic acid anion in an amount of 0.015 mol/kg or more in terms of phosphorus, (D) a component containing at least one member selected from the group consisting of a water soluble organic polymer, a water dispersible organic polymer and a polymer-forming resin in an amount of 0.10% or more, and (E) an acid component.

The chemical conversion treatment agent of Patent Document 2 contains zirconium, fluorine and an amino group-containing silane coupling agent, in which the content of zirconium in the chemical conversion treatment agent is from 100 to 700 ppm in terms of metal, and the molar ratio of fluorine to zirconium is from 3.5 to 7.0.

There has been a proposal of a chemical conversion treatment agent that has corrosion resistance equivalent to an conventional chromate chemical conversion coating and does not contain chromate and resin (see, for example, Patent Document 3).

The chemical conversion treatment agent of Patent Document 3 contains as essential components at least one member selected from the group consisting of zirconium, titanium and hafnium, and fluorine, in which the concentration of fluorine is 10% or less in terms of element ratio.

RELATED ART DOCUMENTS

Patent Documents

Patent Document 1: JP-A-7-145486
Patent Document 2: WO2006/118218
Patent Document 3: JP-A-2009-185392

SUMMARY OF THE INVENTION

Problems to be Solved by the Invention

However, the aqueous liquid composition disclosed in Patent Document 1 contains an organic resin, such as a water soluble organic polymer, a water dispersible organic polymer or a polymer-forming resin, and the chemical conversion treatment agent disclosed in Patent Document 2 contains an organic resin formed through hydrolysis and dehydration condensation of an amino group-containing silane coupling agent. Accordingly, they may suffer a problem in weather resistance in members exposed outside (such as roof) and may suffer a problem in corrosion resistance in home electric appliances, in some cases. These problems may occur due to the use of the resin component and may be solved by using inorganic materials for the components.

Depending on purposes and processes for a metal material, such as a galvanized steel sheet material, a steel sheet material and an aluminum material, there are cases where a lubricating oil is used on processing, and a member having been applied chemical conversion and a member having not been applied chemical conversion are combined and then again applied chemical convertion treatment. In these cases, the member which has been already applied chemical conversion treatment is subjected to alkaline degreasing.

In the case where a member is treated with a convensional chemical convertion treatment agent containing no organic resin, such as the chemical conversion treatment agent disclosed in Patent Document 3, the chemical conversion coat of the member having been applied chemical conversion treatment remains after being damaged by the alkaline degreasing, which may cause insufficient corrosion resistance after the alkaline degreasing.

There has not been known a surface treatment agent that forms a chromium-free chemical conversion coating film excellent in adhesiveness to the metal surface, corrosion resistance, and corrosion resistance after the alkaline degreasing, and excellent in adhesiveness to a paint film formed on the chemical conversion coating film.

Under the circumstances, an object of the present invention is to provide an inorganic chromium-free surface treatment agent that forms a chromium-free chemical conversion coating film excellent in adhesiveness to the metal surface, corrosion resistance, and corrosion resistance after the alkaline degreasing, and excellent in adhesiveness to a paint film formed on the chemical conversion coating film, in primary rust prevention of a metal material, such as a galvanized steel sheet material, a steel sheet material and an aluminum material.

Means for Solving the Problems

As a result of earnest investigations made by the present inventors for achieving the object, it has been found that a chemical conversion coating film that is excellent in corrosion resistance and corrosion resistance after the alkaline degreasing and provides high adhesiveness to a paint film formed on the film may be obtained by etching a surface of a metal material with a particular anion and reacting the anion with a particular cation. The present invention has been completed based on the knowledge. The present invention provides the following.

(1) An inorganic chromium-free metal surface treatment agent containing a compound X containing a metal $X^1$, ionic species of which containing the metal $X^1$ become cations in an aqueous solution, and a compound Y containing a metal $Y^1$, ionic species of which containing the metal $Y^1$ become anions in an aqueous solution, a total content of the compound X being from 0.01 to 10% by mass, a total content of the compound Y being from 0.01 to 10% by mass, a molar ratio of the metal $X^1$ in the cation and the metal $Y^1$ in the anion ((metal $X^1$)/(metal $Y^1$)) being from 0.1 to 5, the metal $X^1$ being at least one member selected from the group consisting of Ti, Zr and Al, the metal $Y^1$ being at least one member selected from the group consisting of Ti, Zr, Si, B and Al, and the metal surface treatment agent containing substantially no organic resin.

(2) The inorganic chromium-free metal surface treatment agent according to the item (1), wherein the compound X has a structure represented by $X^1$=O.

(3) The inorganic chromium-free metal surface treatment agent according to the item (1) or (2), wherein the compound Y contains fluorine.

(4) The inorganic chromium-free metal surface treatment agent according to any one of the items (1) to (3), which further contains at least one phosphorus-containing compound selected from the group consisting of phosphoric acid, phosphorous acid, condensed phosphoric acid, phosphonic acid, and a derivative of any one of them, in an amount of from 0.01 to 10% by mass.

(5) The inorganic chromium-free metal surface treatment agent according to any one of the items (1) to (4), which further contains at least one vanadium compound, in an amount of from 0.01 to 5% by mass.

(6) The inorganic chromium-free metal surface treatment agent according to the item (5), wherein the vanadium compound is selected from the group consisting of vanadic acid and a salt thereof.

Advantages of the Invention

According to the present invention, such an inorganic chromium-free surface treatment agent is provided that forms a chromium-free chemical conversion coating film excellent in adhesiveness to the metal surface, corrosion resistance, and corrosion resistance after the alkaline degreasing, and excellent in adhesiveness to a paint film formed on the chemical conversion coating film, in primary rust prevention of a metal material, such as a galvanized steel sheet material, a steel sheet material and an aluminum material.

EMBODIMENTS FOR CARRYING OUT THE INVENTION

The inorganic chromium-free metal surface treatment agent contains a compound X containing a metal $X^1$, ionic species of which containing the metal $X^1$ become cations in an aqueous solution, and a compound Y containing a metal $Y^1$, ionic species of which containing the metal $Y^1$ become anions in an aqueous solution, and contains substantially no organic resin.

It is considered that the anion (containing the metal $Y^1$) formed from the compound Y etches a surface of a metal material, thereby increasing the pH in the vicinity of the surface, and the anion reacts with the cation (containing the metal $X^1$) formed from the compound X to deposit on the surface, thereby forming a film that is excellent in corrosion resistance and corrosion resistance after alkaline degreasing and has high adhesiveness to the metal material.

The treatment agent contains substantially no organic resin and thus can be suppressed in deterioration of the weather resistance and the corrosion resistance due to the use of a resin component.

The total content of the compound X is from 0.01 to 10% by mass, preferably from 0.2 to 8% by mass, and more preferably from 0.5 to 5% by mass. When the total content of the compound X is less than 0.01% by mass, the corrosion resistance and the corrosion resistance after alkaline degreasing may not be sufficiently imparted. When the total content of the compound X exceeds 10% by mass, the corrosion resistance after alkaline degreasing may be particularly deteriorated.

The total content of the compound Y is from 0.01 to 10% by mass, preferably from 0.1 to 8.5% by mass, and more preferably from 0.3 to 7% by mass.

When the total content of the compound Y is less than 0.01% by mass, the corrosion resistance and the corrosion resistance after alkaline degreasing may not be sufficiently imparted. When the total content of the compound Y exceeds 10% by mass, the corrosion resistance after alkaline degreasing may be particularly deteriorated.

The term "total content" for the compound X and the compound Y means the content of the compound X when only one kind of the compound X is used, and the total of the contents of the compounds X when plural compounds X are used, and similarly means the content of the compound Y when only one kind of the compound Y is used, and the total of the contents of the compounds Y when plural compounds Y are used.

The lower limit of the molar ratio of the metal $X^1$ in the cation and the metal $Y^1$ in the anion ((metal $X^1$)/(metal $Y^1$)) is preferably 0.1, and the upper limit of the molar ratio is preferably 5. When the molar ratio is less than 0.1 or exceeds 5, an excellent film may not be formed due to deterioration in quantitative balance between the anion and the cation, and the corrosion resistance and the corrosion resistance after alkaline degreasing may be insufficient. The lower limit is more preferably 0.2, and further preferably 0.5. The upper limit is more preferably 3.5, and further preferably 2.

The metal $X^1$ is preferably at least one member selected from the group consisting of Ti, Zr and Al.

Examples of the compound X include a hydrolyzable titanium alkoxide, such as titanium diisopropoxybis(acetylacetonate) and titanium diisopropoxybis(triethanolaminate), titanium sulfate, titanium oxysulfate, titanium ammonium sulfate, titanium nitrate, titanium oxynitrate, titanium ammonium nitrate, zirconyl ammonium carbonate, zirconium sulfate, zirconyl sulfate, zirconyl ammonium sulfate, zirconium nitrate, zirconyl nitrate, zirconyl ammonium nitrate, zirconyl formate, zirconyl acetate, zirconyl propionate, zirconyl butylate, salt of oxalic acid and zirconyl ion, salt of malonic acid and zirconyl ion, salt of succinic acid and zirconyl ion, zirconium tetraacetylacetonate, zirconium tri(butoxyacetylacetonate), zirconium oxychloride, aluminum acetate, basic aluminum acetate, aluminum nitrate, aluminum sulfate and aluminum hydroxide oxide.

The compound X is preferably a compound having a structure represented by $X^1=O$. Examples of the compound having a structure represented by $X^1=O$ include titanium oxysulfate, titanium oxynitrate, zirconyl ammonium carbonate, zirconyl sulfate, zirconyl ammonium sulfate, zirconyl nitrate, zirconyl ammonium nitrate, zirconyl formate, zirconyl acetate, zirconyl propionate, zirconyl butylate, salt of oxalic acid and zirconyl ion, salt of malonic acid and zirconyl ion, salt of succinic acid and zirconyl ion, zirconium oxychloride and aluminum hydroxide oxide. When the compound X has a structure represented by $X^1=O$, the crosslinking property on forming a film may be enhanced, thereby providing a film that is further enhanced in the corrosion resistance and the corrosion resistance after alkaline degreasing. The compound X is further preferably a compound having a structure represented by $Zr=O$.

The metal $Y^1$ is preferably at least one member selected from the group consisting of Ti, Zr, Si, B and Al, and more preferably at least one member selected from the group consisting of Ti, Zr and Si.

The compound Y preferably contains fluorine in consideration of the etching capability mentioned above. Examples of the compound Y containing fluorine include a fluorometallic acid, such as fluorotitanic acid, fluorozirconic acid, silicofluoric acid, borofluoric acid and hexafluoroaluminic acid, and fluorometallic acid salt thereof, a mixture of a zirconyl compound having a structure represented by $Zr=O$ and acidic ammonium fluoride, and a metal oxo-acid, such as titanic acid, silicic acid, boric acid and aluminic acid, and salts thereof.

Examples of the mixture of a zirconyl compound having a structure represented by $Zr=O$ and acidic ammonium fluoride include a mixture of zirconyl acetate and acidic ammonium fluoride, and a mixture of zirconyl ammonium carbonate and acidic ammonium fluoride. The molar ratio of the zirconyl compound and acidic ammonium fluoride is preferably in a range of from 2/1 to 1/3. In the case of using the mixture of a zirconyl compound having a structure represented by $Zr=O$ and acidic ammonium fluoride, it is considered that the total amount of the zirconium compound is converted to the compound Y in the case where the 1/6 of the molar number of fluorine contained in acidic ammonium fluoride is equal to or larger than the molar number of zirconium contained in the zirconyl compound. In the case where the 1/6 of the molar number of fluorine contained in acidic ammonium fluoride is less than the molar number of zirconium contained in the zirconyl compound, the zirconium compound that corresponds to 1/6 of the molar number of fluorine contained in acidic ammonium fluoride is converted to the compound Y, and the zirconium compound that corresponds to the proportion exceeding 1/6 of the molar number of fluorine contained in acidic ammonium fluoride contributes as the compound X to the formation of the film.

When the compound Y contains fluorine, etching on the metal surface is liable to occur, thereby forming a film that is excellent in corrosion resistance and corrosion resistance after alkaline degreasing and has high adhesiveness to the metal material.

Preferred examples of the combination of the compound X and the compound Y include a combination, in which the compound X is one of zirconyl sulfate, zirconyl nitrate and zirconyl acetate, and the compound Y is one of fluorotitanic acid, fluorozirconic acid, silicofluoric acid, and salts thereof, and more preferred examples thereof include a combination, in which the compound Y is one of fluorozirconic acid and a salt thereof. The use of the combination enhances the crosslinking property on forming the film, thereby forming a film that is further excellent in corrosion resistance and corrosion resistance after alkaline degreasing.

The metal surface treatment agent of the present invention contains substantially no organic resin for forming a film. The organic resin referred herein means a polymer formed from a monomer component through polycondensation. Examples of the monomer component include a compound having an ethylenic unsaturated double bond group and a compound having plural crosslinkable functional group (such as an epoxy group, a carboxyl group, an isocyanate group, an amino group and a hydroxyl group). Examples of the organic resin include a polyolefin resin, a polyurethane resin, a polyester resin, an acrylic resin, an epoxy resin, an alkyd resin, and a hydrolytic condensation product of a silane coupling agent. The language "containing substantially no organic resin for forming a film" means that the content of the organic resin for forming a film contained in the metal surface treatment agent is less than 50 ppm. When the content of the organic resin for forming a film contained in the metal surface treatment agent is less than 50 ppm, the amount of the organic resin in the film is sufficiently small, which prevents problems in weather resistance and the like from occurring.

The metal surface treatment agent of the present invention contains not only substantially no compound containing hexavalent chromium, but also substantially no compound containing trivalent chromium, in view of the environment and the safety. The language "containing substantially no compound containing chromium" means that the content of metallic chromium derived from the chromium compound in the metal surface treatment agent is less than 1 ppm.

The inorganic chromium-free metal surface treatment agent of the present invention preferably contains at least one phosphorus-containing compound selected from the group consisting of phosphoric acid, phosphorous acid, condensed phosphoric acid, phosphonic acid, and a derivative of any one of them, in an amount of from 0.01 to 10% by mass, and more preferably in an amount of from 0.3 to 6% by mass. When the phosphorus-containing compound is contained in an amount of from 0.01 to 10% by mass, the corrosion resistance, the adhesiveness to the metal material, and the adhesiveness to the paint film may be enhanced.

Examples of the phosphorus-containing compound include a phosphonic acid compound, such as 1-hydroxyethylidene-1,1-diphosphonic acid, 2-phosphonobutane-1,2,4-tricarboxylic acid, ethylenediaminetetramethylenephosphonic acid, aminotrimethylenephosphonic acid, phenylphosphonic acid and octylphosphonic acid, and a salt thereof, a phosphoric acid compound, such as phosphoric acid and phosphorous acid, and a salt thereof, and a condensed phosphoric acid, such as pyrophosphoric acid and tripolyphosphoric acid, and a salt thereof. The phosphorus-containing compound is preferably 1-hydroxyethylidene-1,1-diphosphonic acid, 2-phosphonobutane-1,2,4-tricarboxylic acid or aminotrimethylenephosphonic acid.

The inorganic chromium-free metal surface treatment agent of the present invention preferably contains at least one vanadium compound in an amount of from 0.01 to 5% by mass, and more preferably from 0.1 to 3% by mass. When at least one vanadium compound is contained in an amount of from 0.01 to 5% by mass, the corrosion resistance and the corrosion resistance after the alkaline degreasing may be enhanced.

The vanadium compound used may be a compound having vanadium with an oxidation number of 5. Specific examples thereof include metavanadic acid and a salt thereof, vanadium oxide, vanadium trichloride, vanadium oxytrichloride, vanadium acetylacetonate, vanadium oxyacetylacetonate, vanadyl sulfate, vanadium sulfate, vanadium nitrate, vanadium phosphate, vanadium acetate and vanadium biphosphate.

Among these, vanadic acid, which is an oxo-acid, has a property of forming a polyacid through self-condensation, and contributes to the film formation, thereby forming a film that has better corrosion resistance and corrosion resistance after the alkaline degreasing. In this point of view, the vanadium compound is preferably selected from vanadic acid and a salt thereof.

The inorganic chromium-free metal surface treatment agent of the present invention may further contain depending on necessity a thickening agent, a leveling agent, a wettability improving agent, a surfactant, a defoaming agent, a water soluble alcohol, a cellosolve solvent and the like.

The inorganic chromium-free metal surface treatment agent of the present invention may be produced by mixing prescribed amounts of at least the compound X and the compound Y, which relate to the present invention, in water. The inorganic chromium-free metal surface treatment agent of the present invention preferably has a solid concentration of from 0.1 to 20% by mass, and more preferably from 1 to 15% by mass.

The surface treatment (chemical conversion) with the inorganic chromium-free metal surface treatment agent of the present invention may be performed in the following manner. In the following description, an ordinary usage (purpose) will be firstly described, and a method of application to a particular usage (such as a primary rust prevention agent and a pretreatment agent for painting for a PCM (pre-coated metal) steel sheet) will be then described.

While the pretreatment of the chemical conversion treatment according to the present invention is not particularly limited, in general, a degreasing treatment with an alkaline degreasing liquid, hot water washing, solvent washing, or the like is performed for removing oil and contamination attached to the metal material, and then surface conditioning is performed depending on necessity with an acid, an alkali or the like. In this case, the surface of the metal material is preferably washed with water after the treatment for removing the degreasing liquid or the like from the surface as much as possible.

The chemical conversion treatment according to the present invention is performed in such a manner that the surface conversion treatment agent of the present invention is coated into a film on the surface of the metal material, such as a galvanized steel sheet material, a steel sheet material and an aluminum material, by such a method as a roll coating method, an air spraying method, an airless spraying method, a dipping method, a spin coating method, a flow coating method, a curtain coating method or a flow coating method, and then dried to form a chemical conversion coating film. The treating temperature at this time is preferably in a range of from 5 to 60° C., and the treating time is preferably approximately from 1 to 300 seconds. When the treating temperature and the treating time are in the ranges, a desired film may be favorably formed with economical advantages. The treating temperature is more preferably from 10 to 40° C., and the treating time is more preferably from 5 to 60 seconds. Examples of the metal material, to which the chemical conversion treatment is applied, include such a metal material as a galvanized steel sheet material, a steel sheet material and an aluminum material.

The metal material, such as a galvanized steel sheet material, a steel sheet material and an aluminum material, may be applied, for example, to a molded article, such as an automobile body, an automobile part, a building material, such as a roof material, an exterior wall material, a support for a plastic greenhouse, a home electric appliance and a part thereof, a guardrail, a sound insulating wall, a steel sheet coil used for a geotechnical product, such as a drainage channel, and a cast product. In the case where the metal material, such as a galvanized steel sheet material, a steel sheet material and an aluminum material, is molded after forming the chemical conversion coating film, a lubricating oil may be applied thereto, and in this case, a degreasing treatment with an alkaline degreasing liquid may be performed subsequent to the molding process in the similar manner as the pretreatment. The degreased member may be used as it is or after coating.

The drying process may not necessarily require heating and may be performed by air drying or physical removal, such as air drying or air blowing, and heat drying may be performed for enhancing the film forming property and the adhesiveness to the metal surface. The temperature in this case is preferably from 30 to 250° C., and more preferably from 40 to 200° C.

The coating weight of the chemical conversion coating film thus formed is preferably from 0.001 to 1 $g/m^2$, and more preferably from 0.02 to 0.5 $g/m^2$, after drying. When the coating weight is from 0.001 to 1 $g/m^2$, sufficient corrosion resistance and adhesiveness to a paint film may be maintained, and the chemical conversion coating film may be prevented from being cracked.

The chemical conversion coating film thus formed is excellent in corrosion resistance both before and after the alkaline degreasing, and has good adhesiveness to a paint film formed on the chemical conversion coating film.

In the subsequent step, a paint film formed of a paint, a lacquer or the like may be formed by a known method on the chemical conversion coating film thus formed, thereby protecting further effectively the surface of the metal material (member) to be protected.

The thickness of the paint film thus formed is preferably from 0.3 to 50 μm after drying.

A method of applying the metal surface treatment agent to a particular purpose (such as a primary rust prevention agent and a pretreatment agent for painting for a PCM steel sheet) will be described.

In the following description, an example where the metal surface treatment agent is applied to a more preferred metal sheet is described, but the metal surface treatment agent is not applicable only to the metal sheet, and the present invention is not limited to the following description. The specific numerical values described blow may be applied to any metal sheet, to which the metal surface treatment agent is applicable.

The term "PCM steel sheet" herein is a steel sheet having been coated in advance, and may be processed and fabricated to form a final product.

In the case where the metal surface treatment agent of the present invention is used as a primary rust prevention agent for a galvanized steel sheet material, an aluminum sheetd steel sheet or an aluminum sheet, the coating weight of the chemical film (i.e., the film formed with the metal surface treatment agent of the present invention) is preferably from 0.001 to 0.7 $g/m^2$ after drying for ensuring the sufficient corrosion resistance and the adhesiveness between the metal substrate and the paint film. The process for forming the film may be those having been described.

The case where the metal surface treatment agent of the present invention is used as a pretreatment agent for painting for a PCM steel sheet of a galvanized steel sheet, an aluminum plated steel sheet or an aluminum sheet will be described.

A PCM steel sheet has a paint film that is required to have processing adhesiveness capable of withstanding severe post-processing, such as bending and drawing. Accordingly, a base treatment film is formed on a steel sheet with the inorganic chromium-free metal surface treatment agent (i.e., the pretreatment agent for painting for a PCM steel sheet) of the present invention. The film imparts excellent processing adhesiveness to the paint film by bonding the upper layers (i.e., the PCM primer layer and the upper paint film) to the metal surface, which is difficult to exhibit sufficient adhesiveness. The process for forming the film may be those having been described.

The metal material may be such a metal material that has been subjected to another chemical conversion treatment before performing the chemical conversion treatment with the metal surface treatment agent of the present invention. In the case where a metal material that has been subjected to another chemical conversion treatment is used, the total coating weight of the chemical conversion coating film having been formed and the chemical cinversion coating film formed with the metal surface treatment agent of the present invention is preferably from 0.02 to 0.5 g/m$^2$ after drying, for ensuring the sufficient corrosion resistance and the adhesiveness between the metal substrate and the paint film.

The PCM primer paint for forming the PCM primer layer is not particularly limited, and any primer that is free of a chromate rust prevention pigment contained in the primer (i.e., a non-chromate primer) may be used. The thickness of the paint film of the primer is preferably from 1 to 20 μm in terms of dry thickness for ensuring the corrosion resistance and the processing adhesiveness. The baking condition of the non-chromate primer is preferably from 100 to 250° C.

The PCM top coating paint for forming a top coat paint film provided on the PCM primer layer is not particularly limited, and any ordinary top coat paint may be used. The thickness of the paint film of the top coat paint is preferably from 1 to 30 μm in terms of dry thickness for ensuring the corrosion resistance and the processing adhesiveness. The coating methods of the non-chromate primer and the top coat paint are not particularly limited, and a dipping method, a spraying method, a roll coating method, a curtain coating method, an air spraying method, an airless spraying method and the like, which are ordinarily employed, may be employed.

EXAMPLE

The present invention will be described in more detail with reference to examples below, but the present invention is not limited to the examples.

Examples 1 to 12 and 44 to 46 and Comparative Examples 3 to 8, 10 and 11

The compound X and the compound Y were added to water in the prescribed amounts shown in Tables 1-1, 1-3 and 1-4 to make a total amount of 1,000 parts by mass, thereby preparing metal surface treatment agents. The solid concentration and the molar ratios ((metal $X^1$)/(metal $Y^1$)) of the metal ($X^1$) in the ion species of the cation from the compound X and the metal ($Y^1$) in the ion species of the anion from the compound Y of the metal surface treatment agents are also shown in Tables 1-1, 1-3 and 1-4.

Examples 13 to 19 and 47 to 49

The compound X, the compound Y and the phosphorus-containing compound were added to water in the prescribed amounts shown in Tables 1-1 and 1-3 to make a total amount of 1,000 parts by mass, thereby preparing metal surface treatment agents. The solid concentration and the molar ratios ((metal $X^1$)/(metal $Y^1$)) of the metal ($X^1$) in the ion species of the cation from the compound X and the metal ($Y^1$) in the ion species of the anion from the compound Y of the metal surface treatment agents are also shown in Tables 1-1 and 1-3.

Examples 20, 21 and 50

The compound X, the compound Y and the vanadium compound were added to water in the prescribed amounts shown in Tables 1-1 and 1-3 to make a total amount of 1,000 parts by mass, thereby preparing metal surface treatment agents. The solid concentration and the molar ratios ((metal $X^1$)/(metal $Y^1$)) of the metal ($X^1$) in the ion species of the cation from the compound X and the metal ($Y^1$) in the ion species of the anion from the compound Y of the metal surface treatment agents are also shown in Tables 1-1 and 1-3.

Examples 22 to 43 and 51 to 56

The compound X, the compound Y, the phosphorus-containing compound and the vanadium compound were added to water in the prescribed amounts shown in Tables 1-1, 1-2 and 1-3 to make a total amount of 1,000 parts by mass, thereby preparing metal surface treatment agents. The solid concentration and the molar ratios ((metal $X^1$)/(metal $Y^1$)) of the metal ($X^1$) in the ion species of the cation from the compound X and the metal ($Y^1$) in the ion species of the anion from the compound Y of the metal surface treatment agents are also shown in Tables 1-1, 1-2 and 1-3. In Example 32, the compound Y was prepared with 9.3 parts by mass of zirconyl acetate and 7.1 parts by mass of acidic ammonium fluoride, and in Example 40, the compound Y was prepared with 10.2 parts by mass of zirconyl ammonium carbonate and 6.5 parts by mass of acidic ammonium fluoride. In Examples 22 to 24 and 26 to 42, the compound Y was prepared by combining two kinds of the phosphorus-containing compounds shown in Tables 1-1, 1-2 and 1-3 in the amounts shown in Tables 1-1, 1-2 and 1-3.

Comparative Example 1

100 parts by mass of ammonium fluorozirconate as the compound Y was added to water to make a total amount of 1,000 parts by mass, thereby preparing metal surface treatment agents. The metal surface treatment agent had a solid concentration of 10% by mass.

Comparative Example 2

100 parts by mass of zirconyl sulfate as the compound X was added to water to make a total amount of 1,000 parts by mass, thereby preparing metal surface treatment agents. The metal surface treatment agent had a solid concentration of 10% by mass.

Comparative Example 9

1.4 parts by mass of zirconyl nitrate as the compound X, and 30 parts by mass of ammonium fluorotitanate, 36 parts by mass of 1-hydroxyethylidene-1,1-diphosphonic acid, 8 parts by mass of ammonium dihydrogenphosphate and 19 parts by mass of ammonium metavanadate as the compound Y were added to water to make a total amount of 1,000 parts by mass, thereby preparing metal surface treatment agents. The metal surface treatment agent had a solid concentration of 9.4% by mass. The molar ratio (($metal\ X^1$)/($metal\ Y^1$)) of Zr ($X^1$) in the ion species of the cation from the compound X and Ti ($Y^1$) in the ion species of the anion from the compound Y of the metal surface treatment agent was 0.04.

Comparative Example 12

5.9 parts by mass of zirconyl sulfate as the compound X, and 0.1 part by mass of ammonium fluorozirconate, 6.7 parts by mass of 1-hydroxyethylidene-1,1-diphosphonic acid, 1.5 parts by mass of ammonium dihydrogenphosphate and 3.6 parts by mass of ammonium metavanadate as the compound Y were added to water to make a total amount of 1,000 parts by mass, thereby preparing metal surface treatment agents. The metal surface treatment agent had a solid concentration of 1.8% by mass. The molar ratio (($metal\ X^1$)/($metal\ Y^1$)) of Zr ($X^1$) in the ion species of the cation from the compound X and Ti ($Y^1$) in the ion species of the anion from the compound Y of the metal surface treatment agent was 70.03.

TABLE 1-1

| | Compound X | | Compound Y | | (($metal\ X^1$)/ ($metal\ Y^1$)) (molar ratio) | Phosphorus-containing compound | | Vanadium compound | | Total solid content (% by mass) |
|---|---|---|---|---|---|---|---|---|---|---|
| | Kind | Content (% by mass) | Kind | Content (% by mass) | | Kind | Content (% by mass) | Kind | Content (% by mass) | |
| Example 1 | 1 | 6.1 | 1 | 8.9 | 0.29 | — | — | — | — | 15 |
| Example 2 | 2 | 2.2 | 2 | 8.0 | 0.28 | — | — | — | — | 10 |
| Example 3 | 4 | 3.3 | 2 | 6.7 | 0.53 | — | — | — | — | 10 |
| Example 4 | 5 | 6.3 | 2 | 3.0 | 2.49 | — | — | — | — | 9 |
| Example 5 | 2 | 4.9 | 2 | 7.1 | 0.69 | — | — | — | — | 12 |
| Example 6 | 6 | 6.5 | 1 | 1.7 | 3.34 | — | — | — | — | 8 |
| Example 7 | 4 | 2.8 | 2 | 4.2 | 0.71 | — | — | — | — | 7 |
| Example 8 | 5 | 3.1 | 2 | 3.9 | 0.94 | — | — | — | — | 7 |
| Example 9 | 6 | 9.7 | 3 | 1.3 | 4.79 | — | — | — | — | 11 |
| Example 10 | 8 | 7.2 | 4 | 0.9 | 1.52 | — | — | — | — | 8 |
| Example 11 | 9 | 7.0 | 5 | 8.0 | 1.05 | — | — | — | — | 15 |
| Example 12 | 6 | 9.5 | 8 | 0.8 | 4.62 | — | — | — | — | 10 |
| Example 13 | 1 | 5.0 | 1 | 6.5 | 0.33 | 1 | 2.5 | — | — | 14 |
| Example 14 | 4 | 3.4 | 2 | 3.6 | 1.01 | 2 | 3.0 | — | — | 10 |
| Example 15 | 6 | 3.8 | 2 | 5.6 | 0.71 | 4 | 5.6 | — | — | 15 |
| Example 16 | 8 | 3.6 | 4 | 0.8 | 0.81 | 6 | 3.4 | — | — | 8 |
| Example 17 | 9 | 2.6 | 5 | 3.7 | 0.85 | 5 | 3.7 | — | — | 10 |
| Example 18 | 5 | 3.2 | 2 | 6.0 | 0.63 | 8 | 2.8 | — | — | 12 |
| Example 19 | 4 | 4.8 | 1 | 4.5 | 0.93 | 7 | 3.0 | — | — | 12 |
| Example 20 | 5 | 0.83 | 2 | 1.2 | 0.82 | — | — | 1 | 0.54 | 3 |
| Example 21 | 5 | 1.0 | 2 | 0.53 | 2.24 | — | — | 2 | 1.3 | 3 |
| Example 22 | 1 | 2.2 | 1 | 3.2 | 0.29 | 5 | 2.4 | 1 | 1.5 | 10 |
| | | | | | | 10 | 0.78 | | | |
| Example 23 | 4 | 0.68 | 2 | 1.0 | 0.73 | 2 | 0.76 | 1 | 0.46 | 3 |
| | | | | | | 9 | 0.25 | | | |
| Example 24 | 5 | 0.42 | 2 | 0.32 | 1.56 | 1 | 0.24 | 1 | 0.15 | 1 |
| | | | | | | 9 | 0.08 | | | |

TABLE 1-2

| | Compound X | | Compound Y | | (($metal\ X^1$)/ ($metal\ Y^1$)) (molar ratio) | Phosphorus-containing compound | | Vanadium compound | | Total solid content (% by mass) |
|---|---|---|---|---|---|---|---|---|---|---|
| | Kind | Content (% by mass) | Kind | Content (% by mass) | | Kind | Content (% by mass) | Kind | Content (% by mass) | |
| Example 25 | 6 | 4.3 | 1 | 3.3 | 1.11 | 3 | 4.8 | 1 | 2.9 | 15 |
| Example 26 | 5 | 1.6 | 2 | 1.6 | 1.19 | 1 | 1.4 | 1 | 0.7 | 6 |
| | | | | | | 9 | 0.5 | | | |
| Example 27 | 6 | 3.3 | 1 | 2.3 | 1.21 | 2 | 1.2 | 1 | 1.2 | 9 |
| | | | | | | 9 | 0.7 | | | |
| Example 28 | 5 | 0.11 | 2 | 0.16 | 0.82 | 1 | 0.12 | 1 | 0.07 | 0.5 |
| | | | | | | 9 | 0.04 | | | |
| Example 29 | 5 | 0.022 | 2 | 0.032 | 0.82 | 1 | 0.024 | 1 | 0.014 | 0.1 |
| | | | | | | 9 | 0.008 | | | |
| Example 30 | 1 | 4.2 | 1 | 5.5 | 0.33 | 1 | 4.3 | 1 | 4.5 | 20 |
| | | | | | | 9 | 1.9 | | | |

TABLE 1-2-continued

|  | Compound X | | Compound Y | | ((metal X$^1$)/(metal Y$^1$)) (molar ratio) | Phosphorus-containing compound | | Vanadium compound | | Total solid content (% by mass) |
|---|---|---|---|---|---|---|---|---|---|---|
|  | Kind | Content (% by mass) | Kind | Content (% by mass) |  | Kind | Content (% by mass) | Kind | Content (% by mass) |  |
| Example 31 | 4 | 3.6 | 2 | 2.9 | 1.33 | 2 | 2.4 | 2 | 1.5 | 11 |
|  |  |  |  |  |  | 9 | 0.78 |  |  |  |
| Example 32 | 4 | 0.68 | 6 | Zr: 0.93 | 0.73 | 2 | 0.76 | 1 | 0.46 | 4 |
|  |  |  |  | F: 0.71 |  | 9 | 0.25 |  |  |  |
| Example 33 | 5 | 0.29 | 2 | 1.0 | 0.34 | 1 | 0.22 | 1 | 0.12 | 2 |
|  |  |  |  |  |  | 9 | 0.14 |  |  |  |
| Example 34 | 6 | 1.2 | 2 | 1.2 | 1.04 | 2 | 0.6 | 1 | 0.6 | 4 |
|  |  |  |  |  |  | 9 | 0.4 |  |  |  |
| Example 35 | 5 | 1.5 | 2 | 1.2 | 1.48 | 1 | 0.8 | 1 | 0.5 | 5 |
|  |  |  |  |  |  | 9 | 0.5 |  |  |  |
| Example 36 | 4 | 3.1 | 2 | 1.8 | 1.84 | 1 | 1.0 | 1 | 0.9 | 7 |
|  |  |  |  |  |  | 10 | 0.6 |  |  |  |
| Example 37 | 5 | 1.2 | 2 | 1.8 | 0.82 | 1 | 1.3 | 1 | 0.77 | 5 |
|  |  |  |  |  |  | 9 | 0.44 |  |  |  |
| Example 38 | 3 | 0.7 | 2 | 1.1 | 0.93 | 2 | 0.7 | 1 | 0.5 | 3 |
|  |  |  |  |  |  | 9 | 0.38 |  |  |  |
| Example 39 | 10 | 0.42 | 2 | 1.49 | 1.13 | 2 | 0.77 | 1 | 0.8 | 4 |
|  |  |  |  |  |  | 9 | 0.35 |  |  |  |

TABLE 1-3

|  | Compound X | | Compound Y | | ((metal X$^1$)/(metal Y$^1$)) (molar ratio) | Phosphorus-containing compound | | Vanadium compound | | Total solid content (% by mass) |
|---|---|---|---|---|---|---|---|---|---|---|
|  | Kind | Content (% by mass) | Kind | Content (% by mass) |  | Kind | Content (% by mass) | Kind | Content (% by mass) |  |
| Example 40 | 7 | 0.8 | 7 | Zr: 1.02 | 0.79 | 2 | 0.81 | 1 | 0.7 | 4 |
|  |  |  |  | F: 0.65 |  | 9 | 0.32 |  |  |  |
| Example 41 | 8 | 0.9 | 2 | 0.6 | 0.74 | 2 | 0.8 | 1 | 0.4 | 3 |
|  |  |  |  |  |  | 9 | 0.41 |  |  |  |
| Example 42 | 6 | 3 | 2 | 2.5 | 1.25 | 2 | 1 | 1 | 1.5 | 9 |
|  |  |  |  |  |  | 9 | 0.5 |  |  |  |
| Example 43 | 4 | 1.1 | 2 | 1.7 | 0.73 | 1 | 0.21 | 1 | 0.77 | 6 |
|  |  |  |  |  |  | 2 | 1.3 |  |  |  |
|  |  |  |  |  |  | 9 | 0.42 |  |  |  |
| Example 44 | 1 | 1.1 | 2 | 0.73 | 0.79 | — | — | — | — | 1.8 |
| Example 45 | 2 | 0.75 | 2 | 1 | 0.75 | — | — | — | — | 1.8 |
| Example 46 | 5 | 0.81 | 2 | 1 | 0.96 | — | — | — | — | 1.8 |
| Example 47 | 4 | 0.61 | 2 | 0.65 | 1.01 | 2 | 0.51 | — | — | 1.8 |
| Example 48 | 8 | 0.8 | 2 | 0.54 | 0.73 | 4 | 0.42 | — | — | 1.8 |
| Example 49 | 4 | 0.7 | 1 | 0.66 | 0.93 | 7 | 0.44 | — | — | 1.8 |
| Example 50 | 6 | 0.58 | 2 | 0.84 | 0.72 | — | — | 1 | 0.38 | 1.8 |
| Example 51 | 4 | 0.38 | 2 | 0.56 | 0.73 | 2 | 0.43 | 1 | 0.26 | 1.8 |
|  |  |  |  |  |  | 9 | 0.14 |  |  |  |
| Example 52 | 4 | 0.37 | 2 | 0.51 | 0.79 | 1 | 0.07 | 1 | 0.26 | 1.8 |
|  |  |  |  |  |  | 2 | 0.44 |  |  |  |
|  |  |  |  |  |  | 9 | 0.14 |  |  |  |
| Example 53 | 7 | 0.5 | 2 | 0.42 | 1.09 | 3 | 0.55 | 1 | 0.33 | 1.8 |
| Example 54 | 5 | 0.22 | 2 | 0.32 | 0.82 | 1 | 0.24 | 1 | 0.15 | 1.0 |
|  |  |  |  |  |  | 9 | 0.09 |  |  |  |
| Example 55 | 3 | 0.36 | 2 | 0.57 | 0.95 | 2 | 0.36 | 1 | 0.27 | 1.8 |
|  |  |  |  |  |  | 9 | 0.19 |  |  |  |
| Example 56 | 5 | 0.4 | 2 | 0.52 | 0.91 | 2 | 0.46 | 1 | 0.23 | 1.8 |
|  |  |  |  |  |  | 9 | 0.17 |  |  |  |

TABLE 1-4

| | Compound X | | Compound Y | | ((metal X¹)/ (metal Y¹)) (molar ratio) | Phosphorus-containing compound | | Vanadium compound | | Total solid content (% by mass) |
|---|---|---|---|---|---|---|---|---|---|---|
| | Kind | Content (% by mass) | Kind | Content (% by mass) | | Kind | Content (% by mass) | Kind | Content (% by mass) | |
| Comparative Example 1 | — | — | 2 | 10 | — | — | — | — | — | 10 |
| Comparative Example 2 | 5 | 10 | — | — | — | — | — | — | — | 10 |
| Comparative Example 3 | 6 | 13 | 1 | 2.5 | 4.42 | — | — | — | — | 16 |
| Comparative Example 4 | 4 | 6.7 | 2 | 12 | 0.60 | — | — | — | — | 19 |
| Comparative Example 5 | 5 | 0.005 | 2 | 0.005 | 1.19 | — | — | — | — | 0.01 |
| Comparative Example 6 | 4 | 12 | 1 | 11 | 0.96 | — | — | — | — | 23 |
| Comparative Example 7 | 1 | 6.1 | 1 | 0.38 | 6.87 | — | — | — | — | 6 |
| Comparative Example 8 | 6 | 0.39 | 1 | 9.4 | 0.04 | — | — | — | — | 10 |
| Comparative Example 9 | 6 | 0.14 | 1 | 3.0 | 0.04 | 1 | 3.6 | 1 | 1.9 | 9 |
| | | | | | | 9 | 0.8 | | | |
| Comparative Example 10 | 6 | 0.07 | 1 | 1.7 | 0.04 | — | — | — | — | 1.8 |
| Comparative Example 11 | 1 | 1.7 | 1 | 0.11 | 6.62 | — | — | — | — | 1.8 |
| Comparative Example 12 | 5 | 0.59 | 2 | 0.01 | 70.03 | 1 | 0.67 | 1 | 0.36 | 1.8 |
| | | | | | | 9 | 0.15 | | | |

The legends in Tables 1-1 to 1-4 above are as follows.
Compound X
1: hydrolyzable titanium alkoxide (Orgatix TC-400, produced by Matsumoto Fine Chemical Co. Ltd.) (cation: $Ti^{4+}$)
2: titanium(IV) sulfate (cation: $Ti^{4+}$)
3: titanyl(IV) sulfate (cation: $TiO^{2+}$)
4: zirconyl acetate (cation: $ZrO^{2+}$)
5: zirconyl sulfate (cation: $ZrO^{2+}$)
6: zirconyl nitrate (cation: $ZrO^{2+}$)
7: zirconyl ammonium carbonate (cation: $ZrO^{2+}$)
8: zirconium tetraacetylacetonate (cation: $Zr^{4+}$)
9: basic aluminum acetate (cation: $Al^{3+}$)
10: aluminum hydroxide oxide (Nano Boehmite Alumina CAM9010, produced by Tomoe Engineering Co., Ltd.) (cation: $AlO^+$)
Compound Y
1: ammonium fluorotitanate (anion: $TiF_6^{2-}$)
2: ammonium fluorozirconate (anion: $ZrF_6^{2-}$)
3: silicofluoric acid (anion: $SiF_6^{2-}$)
4: borofluoric acid (anion: $BF_4^{-}$)
5: ammonium hexafluoroaluminate (anion: $AlF_6^{3-}$)
6: zirconyl acetate+acidic ammonium fluoride (anion: anion having a composition of ZrO/F=⅙)
7: zirconyl ammonium carbonate+acidic ammonium fluoride (anion: anion having a composition of ZrO/F=⅙)
8: lithium silicate (anion: $SiO_3^{2-}$)
Phosphorus-Containing Compound
1: 1-hydroxyethylidene-1,1-diphosphonic acid
2: 2-phosphonobutane-1,2,4-tricarboxylic acid
3: ethylenediaminetetramethylenephosphonic acid
4: aminotrimethylenephosphonic acid
5: phenylphosphonic acid
6: phosphoric acid
7: pyrophosphoric acid
8: phosphorous acid
9: ammonium dihydrogenphosphate
10: diammonium hydrogenphosphate
Vanadium Compound
1: ammonium metavanadate
2: sodium metavanadate Primary Rust Prevention Agent Examples using the inorganic chromium-free metal surface treatment agent of the present invention as a primary rust prevention agent will be described.

The surface treatment agents produced in Examples and Comparative Examples were evaluated for the storage stability, the corrosion resistance, the corrosion resistance after alkaline degreasing, and the paint film adhesiveness, in the following manners. The results are shown in Tables 2-1 to 2-3.

Storage Stability

The treatment agents thus produced were stored in a thermostat device at 40° C. for 3 months, and the presence of gelation and/or precipitates was visually observed for each of the treatment agents, and evaluated according to the following standard. The evaluation grade 4 is acceptable.

4: Gelation and precipitation of solid matters were not observed.
2: Gelation or precipitation of solid matters was observed.

Corrosion Resistance

The surface treatment agents produced in Examples and Comparative Examples were coated on the materials shown in Tables 2-1 to 2-3 by using a bar coater, and dried at an arrival temperature of the metal substrate of 80° C., thereby producing test panels each having a chemical conversion coating film formed thereon. After sealing the end surfaces and the back surface of the test panel, a salt water spraying test was performed by spraying a 5% saline solution at 35° C. onto the coated surface. The extent of generation of white rust after 120 hours was visually observed, and evaluated according to the following standard. The evaluation grades 4 and 5 are acceptable.

The time required for generating rust over 5% or more of the entire surface is also shown (in the column "Time" in the tables).

5: The area with white rust formed was less than 5% of the entire surface.
4: The area with white rust formed was 5% or more and less than 25% of the entire surface.
3: The area with white rust formed was 25% or more and less than 50% of the entire surface.
2: The area with white rust formed was 50% or more of the entire surface.
-: The evaluation was not performed (due to the inferior storage stability).

Adhesiveness to Metal Material

On the treated surface of the test panel, an adhesive tape was attached and peeled off, and the state of the chemical conversion coating film remaining was confirmed. Thereafter, the salt water spraying test was performed in the same manner as above, and the time required for generating rust over 5% or more of the entire surface was measured (in the column "Time" in the tables).

Based on the results obtained, the adhesiveness to a metal material was evaluated according to the following standard. The evaluation grade 4 is acceptable.
4: The film remained, and the corrosion resistance was not changed.
2: The film was peeled off over the entire surface.

Corrosion Resistance after Alkaline Degreasing

The test panel having the chemical film formed thereon was immersed in a solution of Surfcleaner 155, an alkaline cleaner, produced by Nippon Paint Co., Ltd., at 60° C. for 2 minutes, and after washing with water, dried at 80° C., thereby providing a test panel. The test panel was then subjected to the salt water spraying test in the same manner as above, and the extent of generation of white rust after 72 hours was visually observed, and evaluated according to the following standard. The evaluation grades 4 and 5 are acceptable.

The time required for generating rust over 5% or more of the entire surface is also shown (in the column "Time" in the tables).
5: The area with white rust formed was less than 5% of the entire surface.
4: The area with white rust formed was 5% or more and less than 25% of the entire surface.
3: The area with white rust formed was 25% or more and less than 50% of the entire surface.
2: The area with white rust formed was 50% or more of the entire surface.
-: The evaluation was not performed (due to the inferior storage stability).

Paint Film Adhesiveness

For the test panel having the chemical conversion coating film formed thereon, Superlac 100, an acrylic melamine paint, produced by Nippon Paint Co., Ltd., was painted on the upper layer thereof by using a bar coater to a dry thickness of 20 μm, and then dried at 150° C. for 20 minutes, thereby producing a test panel for the paint film adhesiveness test. The test panel was crosscut with a width of 1 mm. The cut portion was extrusion processed to 7 mm with an Erichsen tester, and an adhesive tape was attached to the processed portion, followed by peeling off. The state of peeling off of the paint film was evaluated according to the following standard. The evaluation grades 4 and 5 are acceptable.
5: No peeling was observed.
4: The paint film remained at a proportion of 90% or more and less than 100%.
3: The paint film remained at a proportion of 50% or more and less than 90%.
2: The paint film remained at a proportion of less than 50%.

TABLE 2-1

| | Storage stability | Metal material | Amount of film (g/m$^2$) | Corrosion resistance Evaluation | Time (hr) | Adhesiveness to metal material Evaluation | Time (hr) | Corrosion resistance after alkaline degreasing Evaluation | Time (hr) | Paint film adhesiveness |
|---|---|---|---|---|---|---|---|---|---|---|
| Example 1 | 4 | 1 | 0.50 | 4 | 96 | 4 | 96 | 4 | 48 | 4 |
| Example 2 | 4 | 1 | 0.34 | 4 | 96 | 4 | 96 | 4 | 48 | 4 |
| Example 3 | 4 | 1 | 0.33 | 5 | 144 | 4 | 144 | 4 | 72 | 4 |
| Example 4 | 4 | 1 | 0.31 | 5 | 144 | 4 | 144 | 4 | 48 | 4 |
| Example 5 | 4 | 1 | 0.40 | 4 | 120 | 4 | 120 | 4 | 48 | 4 |
| Example 6 | 4 | 1 | 0.27 | 5 | 144 | 4 | 144 | 4 | 48 | 4 |
| Example 7 | 4 | 1 | 0.23 | 5 | 144 | 4 | 144 | 4 | 72 | 4 |
| Example 8 | 4 | 1 | 0.23 | 5 | 144 | 4 | 144 | 4 | 72 | 4 |
| Example 9 | 4 | 1 | 0.37 | 5 | 144 | 4 | 144 | 4 | 48 | 4 |
| Example 10 | 4 | 1 | 0.27 | 4 | 120 | 4 | 120 | 4 | 48 | 4 |
| Example 11 | 4 | 1 | 0.50 | 4 | 120 | 4 | 120 | 4 | 48 | 4 |
| Example 12 | 4 | 1 | 0.34 | 4 | 96 | 4 | 96 | 4 | 48 | 4 |
| Example 13 | 4 | 1 | 0.47 | 4 | 96 | 4 | 96 | 4 | 48 | 5 |
| Example 14 | 4 | 1 | 0.33 | 5 | 192 | 4 | 192 | 4 | 72 | 5 |
| Example 15 | 4 | 1 | 0.50 | 5 | 192 | 4 | 192 | 4 | 72 | 5 |
| Example 16 | 4 | 1 | 0.26 | 4 | 120 | 4 | 120 | 4 | 48 | 5 |
| Example 17 | 4 | 1 | 0.33 | 4 | 120 | 4 | 120 | 4 | 48 | 5 |
| Example 18 | 4 | 1 | 0.40 | 5 | 144 | 4 | 144 | 4 | 72 | 5 |
| Example 19 | 4 | 1 | 0.41 | 5 | 144 | 4 | 144 | 4 | 72 | 5 |
| Example 20 | 4 | 1 | 0.09 | 5 | 192 | 4 | 192 | 5 | 120 | 4 |
| Example 21 | 4 | 1 | 0.09 | 5 | 192 | 4 | 192 | 5 | 96 | 4 |
| Example 22 | 4 | 2 | 0.34 | 5 | 168 | 4 | 168 | 4 | 72 | 5 |
| Example 23 | 4 | 1 | 0.11 | 5 | 480 | 4 | 480 | 5 | 144 | 5 |
| Example 24 | 4 | 1 | 0.04 | 5 | 240 | 4 | 240 | 5 | 96 | 5 |

TABLE 2-2

| | Storage stability | Metal material | Amount of film (g/m²) | Corrosion resistance Evaluation | Time (hr) | Adhesiveness to metal material Evaluation | Time (hr) | Corrosion resistance after alkaline degreasing Evaluation | Time (hr) | Paint film adhesiveness |
|---|---|---|---|---|---|---|---|---|---|---|
| Example 25 | 4 | 1 | 0.51 | 5 | 720 | 4 | 720 | 5 | 480 | 5 |
| Example 26 | 4 | 4 | 0.19 | 5 | 720 | 4 | 720 | 5 | 240 | 5 |
| Example 27 | 4 | 1 | 0.29 | 5 | 480 | 4 | 480 | 5 | 240 | 5 |
| Example 28 | 4 | 1 | 0.02 | 5 | 168 | 4 | 168 | 4 | 72 | 4 |
| Example 29 | 4 | 1 | 0.003 | 5 | 144 | 4 | 144 | 4 | 48 | 4 |
| Example 30 | 4 | 3 | 0.68 | 5 | 240 | 4 | 240 | 4 | 72 | 5 |
| Example 31 | 4 | 1 | 0.37 | 5 | 960 | 4 | 960 | 5 | 720 | 5 |
| Example 32 | 4 | 1 | 0.13 | 5 | 480 | 4 | 480 | 5 | 144 | 5 |
| Example 33 | 4 | 1 | 0.06 | 5 | 240 | 4 | 240 | 4 | 72 | 5 |
| Example 34 | 4 | 6 | 0.13 | 5 | 720 | 4 | 720 | 5 | 196 | 5 |
| Example 35 | 4 | 5 | 0.15 | 5 | 480 | 4 | 480 | 5 | 168 | 5 |
| Example 36 | 4 | 7 | 0.247 | 5 | 720 | 4 | 720 | 5 | 360 | 5 |
| Example 37 | 4 | 1 | 0.18 | 5 | 720 | 4 | 720 | 5 | 360 | 5 |
| Example 38 | 4 | 1 | 0.11 | 5 | 360 | 4 | 360 | 5 | 120 | 5 |
| Example 39 | 4 | 1 | 0.13 | 5 | 360 | 4 | 360 | 5 | 120 | 5 |
| Example 40 | 4 | 1 | 0.14 | 5 | 480 | 4 | 480 | 5 | 144 | 5 |
| Example 41 | 4 | 1 | 0.10 | 5 | 360 | 4 | 360 | 4 | 72 | 5 |
| Example 42 | 4 | 1 | 0.28 | 5 | 960 | 4 | 960 | 5 | 720 | 5 |
| Example 43 | 4 | 1 | 0.18 | 5 | 720 | 4 | 720 | 5 | 360 | 5 |

TABLE 2-3

| | Storage stability | Metal material | Amount of film (g/m²) | Corrosion resistance Evaluation | Time (hr) | Adhesiveness to metal material Evaluation | Time (hr) | Corrosion resistance after alkaline degreasing Evaluation | Time (hr) | Paint film adhesiveness |
|---|---|---|---|---|---|---|---|---|---|---|
| Comparative Example 1 | 4 | 1 | 0.33 | 1 | 24 | 1 | 24 | 1 | 24 | 1 |
| Comparative Example 2 | 4 | 1 | 0.33 | 1 | 24 | 1 | 24 | 1 | 24 | 1 |
| Comparative Example 3 | 4 | 1 | 0.52 | 2 | 24 | 1 | 24 | 1 | 24 | 1 |
| Comparative Example 4 | 4 | 1 | 0.62 | 2 | 24 | 1 | 24 | 1 | 24 | 1 |
| Comparative Example 5 | 4 | 1 | 0.0003 | 1 | 24 | 1 | 24 | 1 | 24 | 1 |
| Comparative Example 6 | 2 | — | — | — | — | — | — | — | — | — |
| Comparative Example 7 | 4 | 1 | 0.22 | 2 | 24 | 1 | 24 | 1 | 24 | 1 |
| Comparative Example 8 | 4 | 1 | 0.33 | 2 | 24 | 1 | 24 | 1 | 24 | 1 |
| Comparative Example 9 | 4 | 1 | 0.31 | 2 | 24 | 1 | 24 | 2 | 24 | 2 |

The legends in Tables 2-1 to 2-3 above and Table 3 below are as follows.
Metal Material
1: galvalume steel sheet (molten zinc—55% aluminum alloy plated steel sheet)
2: galvanized steel sheet
3: electro-galvanized steel sheet
4: aluminum sheet
5: tin-zinc alloy plated steel sheet
6: aluminum plated steel sheet
7: zinc-aluminum-magnesium alloy plated steel sheet
Pretreatment Agent for Painting
Examples using the inorganic chromium-free metal surface treatment agent of the present invention as a pretreatment agent for painting will be described.

A commercially available PCM primer paint (Flekicoat 600, produced by Nippon Paint Co., Ltd.) was painted (dry thickness: 5.0 µm) and baked at 200° C., and on the baked surface, a PCM top coating paint (Flekicoat 5030, a polyester paint, produced by Nippon Paint Co., Ltd.) was painted (dry thickness: 15 µm) and baked at 225° C., thereby producing a painted steel sheet. Specimens were cut out from the painted steel sheet thus produced to prepare test panels, which were then subjected to the following evaluation tests.
The surface treatment agents produced in Examples and Comparative Examples were evaluated for the corrosion resistance, the combined cycle test, the primary adhesiveness, the secondary adhesiveness, the coin scratch resistance, the alkaline resistance, the acid resistance, the boiling water test, the moisture resistance and the storage stability, in the following manners. The results are shown in Table 3 below.

Corrosion Resistance

The paint film of the test panel thus produced was cut to reach the metal substrate with a cutter knife and subjected to a salt water spraying test (SST) for 480 hours defined in JIS 22371. Thereafter, the test panel was measured for the paint film swelling width from the cut portion (maximum value on one side) and the paint film swelling width from the end surface (maximum value), and evaluated according to the following standard. The evaluation grade 3 or better is acceptable.

Evaluation Standard Cut Portion
5: swelling width of less than 1 mm
4: swelling width of 1 mm or more and less than 2 mm
3: swelling width of 2 mm or more and less than 4 mm
2: swelling width of 4 mm or more and less than 6 mm
1: swelling width of 6 mm or more Evaluation Standard End Surface
5: less than 3 mm
4: 3 mm or more and less than 6 mm
3: 6 mm or more and less than 9 mm
2: 9 mm or more and less than 12 mm
1: 12 mm or more Combined Cycle Test The paint film of the test panel thus produced was cut to reach the metal substrate with a cutter knife and subjected to a combined cycle test (CCT) 200 cycles defined in JIS H8502 (JASO M609-91). Thereafter, the test panel was measured for the paint film swelling width from the cut portion (maximum value on one side) and the paint film swelling width from the end surface (maximum value), and evaluated according to the following standard. The evaluation grade 3 or better is acceptable.

Evaluation Standard Cut Portion
5: swelling width of less than 1 mm
4: swelling width of 1 mm or more and less than 2 mm
3: swelling width of 2 mm or more and less than 4 mm
2: swelling width of 4 mm or more and less than 6 mm
1: swelling width of 6 mm or more Evaluation Standard: End Surface
5: less than 3 mm
4: 3 mm or more and less than 6 mm
3: 6 mm or more and less than 9 mm
2: 9 mm or more and less than 12 mm
1: 12 mm or more Primary Adhesiveness The test panel thus produced was subjected to an OT bending process (bending by 180°) without a spacer intervening at 20° C. according to JIS G3312, and the bent portion was subjected to a tape peeling test. The state of peeling the paint film after the test was visually evaluated. The evaluation was performed by the following standard. The evaluation grade 5 is acceptable.

Evaluation Standard
5: no peeling
4: peeled area of less than 25%
3: peeled area of 25% or more and less than 50%
2: peeled area of 50% or more and less than 75%
1: peeled area of 75% or more Secondary Adhesiveness The test panel thus produced was immersed in boiling water for 8 hours and then sufficiently dried by allowing to stand for one day, and the test panel was subjected to the same test as in the primary adhesiveness test. The evaluation was performed by the following standard. The evaluation grade 4 or better is acceptable.

Evaluation Standard
5: no peeling
4: peeled area of less than 25%
3: peeled area of 25% or more and less than 50%
2: peeled area of 50% or more and less than 75%
1: peeled area of 75% or more Coin Scratch Resistance A new 10 yen coil was disposed at an angle of 45° with respect to the test panel thus produced, and the paint film was scratched therewith at a constant velocity under a load of 3 kg. The extent of damage of the paint film was visually evaluated. The evaluation was performed by the following standard. The evaluation grade 3 or better is acceptable.

Evaluation Standard
5: no peeling (including the case with only primer exposed)
4: peeled area of less than 5%
3: peeled area of 5% or more and less than 25%
2: peeled area of 25% or more and less than 50%
1: peeled area of 50% or more Alkaline Resistance The alkaline resistance was evaluated in the following manner according to ASTM D714-56. The test panel thus produced was immersed in a 5% by mass sodium hydroxide aqueous solution at room temperature for 24 hours, and the size and the formation density of blister formed on the evaluated surface was visually evaluated. The evaluation was performed by the following standard. The evaluation grade 3 or better is acceptable.

Evaluation Standard
5: No blister was found.
4: The size of one piece of blister was less than 0.6 mm, and the formation density thereof was VF or F.
3: The size of one piece of blister was less than 0.6 mm, and the formation density thereof was FM or M; or the size of one piece of blister was 0.6 mm or more and less than 1.2 mm, and the formation density thereof was F or FM.
2: The size of one piece of blister was less than 0.6 mm, and the formation density thereof was MD; or the size of one piece of blister was 0.6 mm or more and less than 1.2 mm, and the formation density thereof was M or MD; or the size of one piece of blister was 1.2 mm or more and less than 1.8 mm, and the formation density thereof was F, FM or MD.
1: The size of one piece of blister was 1.2 mm or more and less than 1.8 mm, and the formation density thereof was MD; or the size of one piece of blister was 1.8 mm or more; or the formation density of blister was D irrespective of the size thereof.

The symbols used for the formation density have the following meanings.
VF: The number of blister formed was very few.
F: The number of blister formed was few.
FM: The number of blister formed was intermediate between F and M.
M: The number of blister formed was large.
MD: The number of blister formed was intermediate between M and D.
D: The number of blister formed was very large.

Acid Resistance

The test panel thus produced was immersed in a 5% by mass sulfuric acid aqueous solution at room temperature for 24 hours, and the size and the formation density of blister formed on the evaluated surface was visually evaluated. The evaluation was performed according to the same evaluation standard as the alkali resistance.

Boiling Water Test

The test panel thus produced was immersed in boiling water for 8 hours, and the size and the formation density of blister formed on the evaluated surface was visually evaluated. The evaluation was performed according to the same evaluation standard as the alkali resistance.

Moisture Resistance

The test panel thus produced was placed in a thermo-hygrostat chamber having an atmosphere of a humidity of 98% and a temperature of 50° C. and allowed to stand therein for 500 hours, and the size and the formation density of blister formed on the evaluated surface was visually evaluated. The evaluation was performed according to the same evaluation standard as the alkaline resistance.

Storage Stability

The treatment agents thus produced were stored in a thermostat device at 40° C. for 3 months, and the presence of gelation and/or precipitates was visually observed for each of the treatment agents, and evaluated according to the following standard. The evaluation grade 4 is acceptable.
4: Gelation and precipitation of solid matters were not observed.
2: Gelation or precipitation of solid matters was observed.

(4) A vanadium compound is contained, and thus the corrosion resistance and the corrosion resistance after alkaline degreasing may be enhanced.

(5) The solid concentration is 1% or more, and thus such an amount of the coating weight may be provided that is sufficient for exhibiting the corrosion resistance and the corrosion resistance after alkaline degreasing.

The invention claimed is:

1. An inorganic chromium-free metal surface treatment agent comprising
   i) a compound X containing a metal $X^1$ which forms cations containing the metal $X^1$ in an aqueous solution,
   ii) a compound $Y^1$ containing a metal which forms anions containing the metal $Y^1$ in an aqueous solution, and
   iii) at least one phosphorus-containing compound selected from the group consisting of phosphoric acid, phosphorous acid, condensed phosphoric acid, phosphonic acid, and derivatives thereof,
   wherein compound X is zirconyl sulfate, zirconyl nitrate or zirconyl acetate, and compound Y is selected from the group consisting of fluorotitanic acid, fluorozirconic acid, silicofluoric acid, and salts thereof,

TABLE 3

| | Metal material | Amount of film (g/m²) | CCT Cut portion | CCT End surface | SST Cut portion | SST End surface | Primary adhesiveness | Secondary adhesiveness | Coin scratch resistance | Alkaline resistance | Acid resistance | Boiling water test | Humidity resistance | Storage stability |
|---|---|---|---|---|---|---|---|---|---|---|---|---|---|---|
| Example 44 | 1 | 0.05 | 4 | 4 | 4 | 3 | 5 | 4 | 4 | 3 | 3 | 4 | 4 | 4 |
| Example 45 | 1 | 0.05 | 4 | 4 | 4 | 3 | 5 | 4 | 4 | 4 | 3 | 3 | 4 | 4 |
| Example 46 | 1 | 0.05 | 4 | 4 | 4 | 4 | 5 | 4 | 4 | 4 | 4 | 4 | 4 | 4 |
| Example 47 | 1 | 0.05 | 4 | 4 | 4 | 4 | 5 | 5 | 5 | 4 | 4 | 4 | 4 | 4 |
| Example 48 | 1 | 0.05 | 4 | 4 | 4 | 3 | 5 | 5 | 5 | 4 | 4 | 4 | 4 | 4 |
| Example 49 | 1 | 0.05 | 4 | 4 | 4 | 3 | 5 | 5 | 5 | 4 | 4 | 5 | 5 | 4 |
| Example 50 | 1 | 0.05 | 5 | 5 | 5 | 4 | 5 | 4 | 4 | 5 | 5 | 5 | 5 | 4 |
| Example 51 | 1 | 0.05 | 5 | 5 | 5 | 5 | 5 | 5 | 5 | 5 | 5 | 5 | 5 | 4 |
| Example 52 | 1 | 0.05 | 5 | 5 | 5 | 5 | 5 | 5 | 5 | 5 | 5 | 5 | 5 | 4 |
| Example 53 | 1 | 0.05 | 5 | 5 | 5 | 5 | 5 | 5 | 5 | 5 | 5 | 5 | 5 | 4 |
| Example 54 | 1 | 0.03 | 5 | 4 | 4 | 4 | 5 | 5 | 5 | 4 | 4 | 5 | 5 | 4 |
| Example 55 | 1 | 0.05 | 5 | 4 | 5 | 4 | 5 | 5 | 5 | 5 | 4 | 5 | 5 | 4 |
| Example 56 | 2 | 0.05 | 5 | 5 | 4 | 4 | 5 | 4 | 5 | 5 | 5 | 5 | 5 | 4 |
| Comparative Example 10 | 1 | 0.05 | 2 | 2 | 1 | 1 | 2 | 2 | 3 | 2 | 1 | 2 | 2 | 4 |
| Comparative Example 11 | 1 | 0.05 | 2 | 2 | 1 | 1 | 2 | 1 | 3 | 1 | 1 | 2 | 2 | 4 |
| Comparative Example 12 | 1 | 0.05 | 3 | 3 | 2 | 1 | 5 | 4 | 4 | 3 | 2 | 3 | 3 | 4 |

All the metal surface treatment agents according to Examples are excellent in the corrosion resistance and the corrosion resistance after alkaline degreasing, as compared to the metal surface treatment agents according to Comparative Examples, and form a chromium-free chemical conversion coating film having high adhesiveness to the paint film. In particular, Examples 23 to 27, 31, 32, 34 to 40, 42 to 43, and 51 to 53 satisfy all the following requirements (1) to (5), and it is thus considered that a film exhibiting considerably excellent capabilities for all the evaluation items may be formed.

(1) The compound X providing the metal $X^1$ as a cation has a structure represented by $X^1=O$, and thus the cross-linking property on forming a film may be enhanced.

(2) The molar ratio (($\text{metal } X^1$)/($\text{metal } Y^1$)) is in a range of from 0.5 to 2, and thus the quantitative balance between the cation species and the anion species may be optimized.

(3) A phosphorus-containing compound is contained, and thus the adhesiveness to the paint film may be enhanced.

the metal surface treatment agent having a total content of the compound X from 0.01 to 10% by mass, a total content of the compound Y from 0.01 to 10% by mass, a total content of the at least one phosphorus-containing compound in an amount of from 0.01 to 10% by mass, and a molar ratio of the metal $X^1$ in the cations to the metal $Y^1$ in the anions from 0.1 to 5, and
wherein the metal surface treatment agent contains substantially no organic resin.

2. The inorganic chromium free metal surface treatment agent according to claim 1, wherein the phosphorus-containing compound is in an amount of from 0.3 to 6% by mass.

3. The inorganic chromium-free metal surface treatment agent according to claim 1, wherein the phosphorus-containing compound is selected from the group consisting of 1-hydroxyethylidene-1,1-diphosphonic acid, 2-phosphonobutane-1,2,4-tricarboxylic acid, ethylenediaminetetramethylenephosphonic acid, aminotrimethylenephosphonic acid, pyrophosphoric acid, phosphorous acid, ammonium dihydrogenphosphate, diammonium hydrogenphosphate, and mixtures of any two or more of these.

4. The inorganic chromium free metal surface treatment agent according to claim 3, wherein the phosphorus-containing compound is in an amount of from 0.3 to 6% by mass.

5. The inorganic chromium-free metal surface treatment agent according claim 1, which further comprises at least one vanadium compound, in an amount of from 0.01 to 5% by mass.

6. The inorganic chromium-free metal surface treatment agent according claim 5, wherein the vanadium compound is in an amount of from 0.01 to 3% by mass.

7. The inorganic chromium-free metal surface treatment agent according to claim 6, wherein the vanadium compound is selected from the group consisting of vanadic acid and a salt thereof.

8. The inorganic chromium-free metal surface treatment agent according to claim 7, wherein the vanadium compound is selected from the group consisting of ammonium metavanadate and sodium metavanadate.

9. The inorganic chromium-free metal surface treatment agent according to claim 5, wherein the vanadium compound is selected from the group consisting of vanadic acid and a salt thereof.

10. The inorganic chromium-free metal surface treatment agent according to claim 5, wherein the metal surface treatment agent consists of the compound X, the compound Y, the phosphorus-containing compound, and the vanadium compound.

11. The inorganic chromium-free metal surface treatment agent according to claim 10, wherein the vanadium compound is in an amount of from 0.01 to 3% by mass, and/or wherein the vanadium compound is selected from the group consisting of vanadic acid and a salt thereof.

12. The inorganic chromium-free metal surface treatment agent according to claim 11, wherein the vanadium compound is selected from the group consisting of ammonium metavanadate and sodium metavanadate.

13. The inorganic chromium-free metal surface treatment agent according to claim 1, wherein the molar ratio of the metal $X^1$ in the cations to the metal $Y^1$ in the anions is from 0.5 to 2.

14. The inorganic chromium-free metal surface treatment agent according to claim 1, wherein compound Y is fluorozirconic acid and/or a salt thereof.

15. The inorganic chromium-free metal surface treatment agent according to claim 1, wherein the metal surface treatment agent contains no vanadium compound.

16. The inorganic chromium-free metal surface treatment agent according to claim 15, wherein the phosphorus-containing compound is in an amount of from 0.3 to 6% by mass, and/or wherein the phosphorus-containing compound is selected from the group consisting of 1-hydroxyethylidene-1,1-diphosphonic acid, 2-phosphonobutane-1,2,4-tricarboxylic acid, ethylenediaminetetra-methylenephosphonic acid, aminotrimethylenephosphonic acid, pyrophosphoric acid, phosphorous acid, ammonium dihydrogenphosphate, diammonium hydrogenphosphate, and mixtures of any two or more of these.

17. The inorganic chromium-free metal surface treatment agent according to claim 1, wherein the metal surface treatment agent consists of the compound X, the compound Y, and the phosphorus-containing compound.

18. The inorganic chromium-free metal surface treatment agent according to claim 17, wherein the molar ratio of the metal $X^1$ in the cations to the metal $Y^1$ in the anions is from 0.5 to 2, and/or wherein compound Y is fluorozirconic acid and/or a salt thereof.

19. An inorganic chromium-free metal surface treatment agent comprising
i) a compound X which is zirconyl sulfate, zirconyl nitrate or zirconyl acetate, and
ii) a compound Y selected from the group consisting of fluorotitanic acid, fluorozirconic acid, silicofluoric acid, and salts thereof,
the metal surface treatment agent having a total content of the compound X from 0.01 to 10% by mass, a total content of the compound Y from 0.01 to 10% by mass, and a molar ratio of the metal $X^1$ in the cations to the metal $Y^1$ in the anions from 0.1 to 5, and
wherein the metal surface treatment agent contains substantially no organic resin.

20. The inorganic chromium-free metal surface treatment agent according to claim 19, wherein the metal surface treatment agent consists of the compound X and the compound Y.

21. The inorganic chromium-free metal surface treatment agent according to claim 19, wherein the molar ratio of the metal $X^1$ in the cations to the metal $Y^1$ in the anions is from 0.5 to 2, and/or wherein compound Y is fluorozirconic acid and/or a salt thereof.

* * * * *